C. J. MARVIN.
GAS GENERATING APPARATUS.
APPLICATION FILED JUNE 24, 1916.
1,222,782.
Patented Apr. 17, 1917.
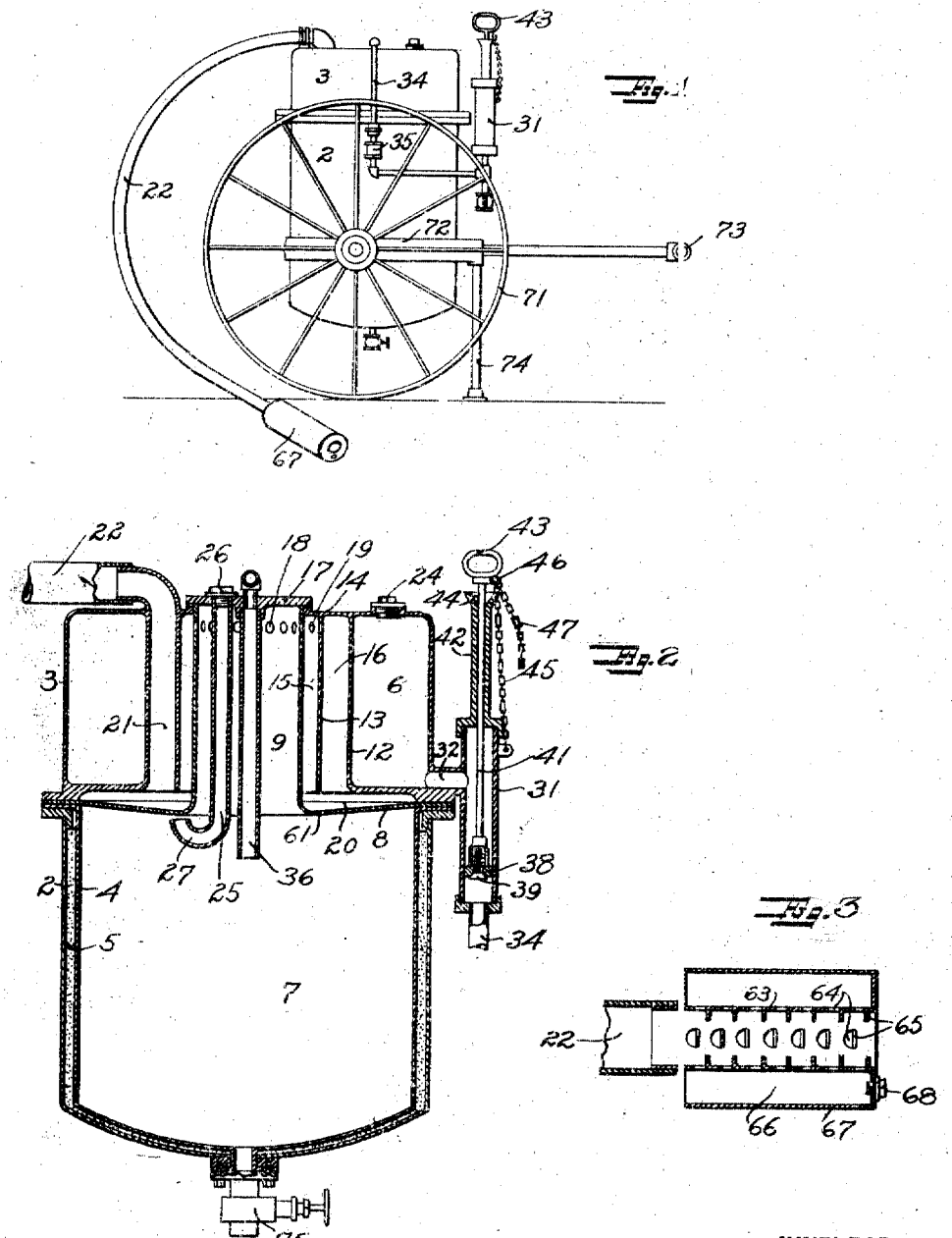

UNITED STATES PATENT OFFICE.

CORNELIUS J. MARVIN, OF LOS ANGELES, CALIFORNIA, ASSIGNOR TO THE BRAUN CORPORATION, OF LOS ANGELES, CALIFORNIA, A CORPORATION OF CALIFORNIA.

GAS-GENERATING APPARATUS.

1,222,782.  Specification of Letters Patent.  Patented Apr. 17, 1917.

Application filed June 24, 1916. Serial No. 105,769.

*To all whom it may concern:*

Be it known that I, CORNELIUS J. MARVIN, a citizen of the United States, and a resident of the city of Los Angeles, county of Los Angeles, State of California, have invented a new and useful Gas-Generating Apparatus, of which the following is a specification.

The invention relates to an apparatus for generating gas to be used for the fumigation of trees and other purposes.

An object of the invention is to provide a gas generating apparatus of simple and improved construction.

Another object of the invention is to provide a gas generating apparatus by which definite measured quantities of gas may be generated.

A further object of the invention is to provide an apparatus in which provision is made for preventing the condensation of the generated gas.

The invention possesses other advantageous features, some of which, with the foregoing, will be set forth at length in the following description, where I shall outline in full that form of the apparatus which I have selected for illustration in the drawings accompanying and forming part of the present specification. In said drawings I have shown only one specific form of the generic invention, but it is to be understood that I do not limit myself to such form, because the invention may be embodied in a multiplicity of forms, each being a species of the said invention.

Referring to said drawings:

Figure 1 is an elevation of the generating apparatus of my invention arranged on wheels so that it may be readily transported.

Fig. 2 is a vertical section of the generating chamber and pump.

Fig. 3 is a section of the trap on the gas discharge conductor.

The present apparatus is particularly adapted to be used in the generation of hydrocyanic acid gas for the fumigation of citrus trees, but it is obvious that it may be employed for the generation of other gases for the same and other purposes. In such tree fumigating operation, the tree is covered with a tent or other suitable covering and an amount of hydrocyanic acid gas is introduced under the tent. The gas is generated in a portable apparatus removed from the tree and conducted under the tent through a suitable hose or conduit. The hydrocyanic acid gas is produced by bringing together suitable quantities of sulfuric acid and an alkali metal cyanid, preferably potassium or sodium cyanid or an alkaline earth metal cyanid, preferably calcium cyanid. Heretofore, measured quantities of sulfuric acid and potassium cyanid solution sufficient to produce the desired charge of gas have been flowed into a receptacle, but great difficulties have been encountered on account of the corrosive action of the acid on the pipes and valves. In accordance with my invention I place a large quantity of sulfuric acid in a receptacle and add thereto successive charges of cyanid solution for producing successive charges of gas until the sulfuric acid has been completely exhausted. I also provide positive means for measuring the amount of cyanid solution entered at each charge, so that the proper quantity of gas for the treatment of the particular tree may be generated.

The apparatus of my invention comprises preferably a shell or container formed in two parts 2 and 3 securely fastened together. The lower part is the acid containing chamber and also the reaction chamber, and consists of the outer metallic shell 2 and an inner shell 4 preferably of lead. The two shells are preferably spaced apart to form a space 5 therebetween which is filled with heat insulation material, for reasons which will become apparent hereinafter. The upper part 3 contains an annular chamber 6 in which the cyanid solution is stored. The lower chamber 7 which contains the acid is provided with a cover plate 8, also formed preferably of lead, which extends upward in a neck 9 into the space within the annular chamber 6. Between the wall of the neck 9 and the inner wall 12 of the annular chamber 6 is preferably an annular wall 13 which depends from the top wall 14 of the upper portion 3, thus forming two relatively narrow concentric chambers 15 and 16 surrounding the neck 9. A cover plate 17 closes the top of the neck 9. The upper portion of the wall of the neck and the upper portion of the wall 13 are pierced with holes 18 and 19 respectively so that the upper portion of the neck is in communication with both the chambers 15 and 16 which in turn open at their bottoms into the annular collection chamber 20 which surrounds the base of the neck and underlies the annular chambers 15, 16 and 6. A discharge pipe 21 leads upward from the collection chamber 20 into a flexible conduit 22.

The compartment 6 is adapted to contain the less corrosive reagent which enters into the gas generating reaction and the compartment 7 contains the more corrosive reagent. Gas is generated in many instances by the reaction of an acid and cyanid or other suitable chemical, and the cyanid is contained in the upper compartment 6 and the acid in the lower compartment 7 which is therefore formed of lead so that the acid will not attack it. When the apparatus is used for the generation of hydrocyanic acid gas the upper chamber 6 contains alkali metal cyanid or alkaline earth metal cyanid solution which is introduced through an aperture normally closed by the plug 24. The lower or reaction chamber 7 is partly filled with dilute sulfuric acid, the acid and the diluent being introduced therein through the lead pipe 25 normally closed by the plug 26. Preferably the pipe is given an upward turn at the lower end 27 to provide a trap so that any gas which may be in the chamber cannot escape when the plug 26 is removed. The amount of acid placed in the compartment is such that space for the proper generation of the gas is left, when the last charge of cyanid solution is added to the already partially spent liquor in the generating chamber.

Means are provided for removing predetermined quantities of the reagent from the chamber 6 and introducing them forcibly into the chamber 7 where the charges of the introduced reagent react with the reagent in chamber 7 to produce the desired quantity of gas. Mounted on the shell is a pump barrel 31 which is connected intermediate its ends with the lower part of the chamber 6 by means of the pipe 32. From the pump barrel 31 the reagent solution is forced through the pipe 34 provided with a check valve 35, into the upper end of the pipe 36 which depends from the cover plate 17 in the neck 9 and from thence forcibly into the reagent in the chamber 7, agitating it by its forcible entry and thus preventing any tendency toward stratification and insuring a perfect and uniform gas generation. The end of the pipe 36 is above the level of the solution in chamber 7 so that the solution cannot siphon over. Arranged in the pump barrel is a hollow apertured piston 38 provided with a spring-held valve 39 which unseats as the piston is moved upwardly. The piston rod 41 extends through the elongated head 42 at the upper end of the pump barrel and terminates in a handle 43 by means of which the piston is reciprocated in the barrel 31. The head 42 is extended upwardly past the level of the solution in the chamber 6 and preferably is provided at the top with a funnel-shaped depression 44 so that solution carried upwardly by the piston rod will collect therein and drain back into the barrel of the pump.

A chain 45 is attached to the upper end of the cylinder 31 and is adapted to have different links inserted over the hook 46 formed integral with the handle 43 in order that the amount of movement of the piston may be variously limited. Preferably the chain includes a number of large links 47 which are the ones commonly fixed upon the hook 46, and the position of these large links upon the chain is such that the quantity of reagent in the pump is determined by hanging the corresponding link upon the hook before the plunger 38 is pulled upwardly to the limit of the chain. For instance, Fig. 2 shows the plunger 38 raised to the limit of the chain when the third large link from the end is secured on the hook 46. This height of the plunger is such that a certain known quantity of reagent from the chamber 6 is contained in the barrel below the plunger. When the handle 43 is depressed, this charge is forced into the generating chamber 7, causing a definite amount of gas to be formed. By hanging the second link 47 on the hook, a definite but larger amount of reagent is collected under the plunger and a correspondingly larger amount of gas is formed when this larger charge is injected into the chamber 7. The amount of gas needed is determined and the link corresponding to the required charge of reagent is hung upon the hook before the handle 43 is pulled up to raise the plunger. If desired, the links 47 may be suitably marked.

The gas generating reaction is somewhat rapid and as the gas is generated it passes up through the neck 9, through the apertures 18 and 19 into the chambers 15 and 16 and downwardly into the collecting chamber 20, whence it passes out through the pipe 21 and the conduit 22 to the tree or other place where it is to be used. The speed of the gas is high during the generation and by abruptly changing the direction of flow of the gas from the neck through the several chambers between the neck and the discharge pipe, the small particles of liquid carried by the gas are separated out. These particles of liquid are caught on the walls of the chambers and eventually collect within the chamber 20 from which the liquid drains back into the chamber 7 through the aperture 61 in the lowest portion of the cover plate 8. Means for removing the entrained liquid from the gas is important since on account of the ebullition occasioned by the reaction, the gas often carries small particles of reagent which would be highly injurious to the trees being fumigated.

It has been explained above that the space 5 between the walls 2 and 4 is filled with a heat insulating material. This is for the purpose of conserving the heat generated by the chemical reaction of the reagents so that the solution in the chamber 7 will retain the heat caused by the dilution of the acid and also that caused by the addition to the dilute acid of the successive charges of cyanid from chamber 6. As the apparatus is moved from one tree to the other, the heat generated by the chemical reactions is thus conserved so that the charges of cyanid are forcibly injected into a hot dilute acid. The gas generated in the reaction chamber is therefore discharged from the apparatus in a heated condition and does not readily condense in the conduit, but means are provided for removing any particles of acid which may condense and entrain in the discharging gas or moisture which may condense upon the walls of the discharge passages.

The end of the conduit 22 is fitted with a trap which consists of a metallic cylinder 63 provided with perforations 64 and baffle plates 65. Conveniently, the plates may be formed by punching and turning up wings from the body of the cylinder. The entire inner surface of the cylinder 63 through which the discharging gas passes is closely covered with the baffle plates so that the entrained particles are caught thereby and drain through the perforations 64 into the annular chamber 66 formed by the wall 67 which is arranged about the inner wall 63. Moisture condensing in the conduit also runs down into the trap. From time to time as may be found necessary, the liquid collected in the trap is drained off through an opening normally closed by a plug 68.

The apparatus is mounted on wheels 71 so that it may be readily moved about. The frame 72 in which the apparatus is mounted and to which the axles of the wheels are attached, is provided with a handle 73 and a leg 74 so arranged that the apparatus may be wheeled to the desired location and there maintained in an upright position.

Preferably the acid is diluted in the chamber so that the heat evolved by the dilution is conserved. Then the charges of reagent from chamber 6 are introduced successively, as successive volumes of gas are needed, until all of the supply of reagent originally contained in the generating chamber 7 has been exhausted, after which the valve 75 is opened to discharge the spent liquor. The valve is then closed and another supply of the reagent is introduced into the chamber 7.

I claim:

1. In a gas generating apparatus, a gas generating chamber having an upstanding neck, a collection chamber having a drain hole therein arranged at the base of said neck, passages connecting the upper portion of the neck with said collection chamber and a discharge pipe connected to said collection chamber.

2. A gas generating apparatus comprising a receptacle containing two separated storage chambers, each adapted to contain a different reagent, means for removing and measuring a definite quantity of reagent from one chamber and forcibly introducing it into the second chamber, a collection chamber for said gas arranged between said storage chambers, and a gas discharge pipe connected to said collection chamber.

3. A generating apparatus comprising a chamber adapted to contain a quantity of reagent, a second chamber adapted to contain a quantity of liquid reagent, a pump connected at its intake side to said liquid reagent containing chamber and at its discharge side to said first chamber and a chain adjustably arranged on said pump for limiting its stroke, whereby different predetermined amounts of the liquid reagent may be introduced into said first chamber.

4. In a gas generating apparatus, a gas generating chamber having an upstanding neck provided with outlet apertures, an annular chamber adapted to contain a liquid reagent spaced from said neck and said gas generating chamber to form an annular space about the neck and above the gas generating chamber, said annular chamber being in communication with said neck through said outlet apertures, and a gas discharge pipe leading from said annular space.

5. In a gas generating apparatus, a heat insulated gas generating chamber adapted to contain a quantity of reagent and having an upstanding neck provided with outlet apertures, a plurality of annular chambers surrounding said neck, one of said chambers adapted to hold a liquid reagent and the other chambers being adapted to receive the gas from said outlet apertures, means for returning particles of liquid deposited on the walls of said gas receiving chambers to the gas generating chamber, and means for discharging the gas from said gas containing annular chambers.

6. A gas generating apparatus comprising a receptacle containing two separated storage chambers, each adapted to contain a different reagent, means for removing and measuring a definite quantity of reagent from one chamber and introducing it into the second chamber, a collection chamber for said gas arranged between said storage chambers, a gas discharge pipe connected to said collection chamber and a pipe having an up-turned lower end for charging said second chamber with reagent.

7. A gas generating apparatus, comprising a chamber adapted to contain a quantity of acid, a second chamber adapted to contain a quantity of reagent solution, means for withdrawing predetermined charges of reagent from one chamber and introducing said charges into the other chamber, a gas outlet passage leading from said acid containing chamber, means in said outlet passage for collecting particles of acid entrained in the gas and means for returning said collected acid to the acid chamber.

8. A gas generating apparatus comprising a receptacle containing a storage chamber and a double walled heat insulated reaction chamber, each adapted to contain a reagent, means for removing a measured quantity of reagent from the storage chamber and introducing it into the reagent in the reaction chamber, a collection chamber arranged between said storage and reaction chambers and in thermal communication with said reaction chamber, and a gas discharge pipe connected to said collection chamber.

In testimony whereof, I have hereunto set my hand at Los Angeles, California, this 14th day of June 1916.

CORNELIUS J. MARVIN.

In presence of—
H. D. MACKINNON,
F. A. HARTLEY.